United States Patent
Kassouni

(10) Patent No.: US 6,772,543 B2
(45) Date of Patent: Aug. 10, 2004

(54) APPARATUS AND METHOD FOR MELTING ICE ON ROOFS

(76) Inventor: Van Kassouni, 334 Fuller, SE., Grand Rapids, MI (US) 49506

( * ) Notice: Subject to any disclaimer, the term of this patent is extended or adjusted under 35 U.S.C. 154(b) by 2 days.

(21) Appl. No.: 09/978,911

(22) Filed: Oct. 16, 2001

(65) Prior Publication Data

US 2003/0070327 A1 Apr. 17, 2003

(51) Int. Cl.[7] ................................................ E01H 5/10
(52) U.S. Cl. ............................................. 37/227; 52/24
(58) Field of Search ................................. 52/24; 37/227

(56) References Cited

U.S. PATENT DOCUMENTS

| | | | | |
|---|---|---|---|---|
| 4,040,865 | A | * 8/1977 | Eggers et al. | 134/7 |
| 4,041,656 | A | * 8/1977 | Anderson | 52/16 |
| 5,492,562 | A | * 2/1996 | Pettinato | 106/284.03 |
| 5,887,584 | A | * 3/1999 | Smith | 126/569 |
| 6,282,846 | B1 | * 9/2001 | Nocella | 52/24 |
| 6,484,453 | B2 | * 11/2002 | Nocella | 52/24 |

FOREIGN PATENT DOCUMENTS

| | | | |
|---|---|---|---|
| DE | 003148417 A1 | * 7/1983 | ................... 252/70 |
| JP | 406108430 A | * 4/1994 | ................... 37/227 |
| JP | 410067588 A | * 3/1998 | ............ C05D/3/02 |

* cited by examiner

*Primary Examiner*—Thomas B. Will
*Assistant Examiner*—Tara L. Mayo
(74) *Attorney, Agent, or Firm*—Van Dyke, Gardner, Linn & Burkhart, LLP

(57) ABSTRACT

A melting member is adapted to melt snow and ice as it contacts the snow and ice. The melting member is a tablet of sufficient size for melting a substantial amount of ice or snow before dissolving. One or more melting members are placed on snow or ice formed on an inclined roof of a building. The melting members melt the snow or ice as they move downwardly toward the roof of the building. The melting members then continue to melt the snow or ice as they slide downward along the inclined surface of the roof of the building. Water from melted snow and ice is then drained through the channels formed by the melting members. The channels also function to break up ice dams formed on the roof to allow for safe and easy removal of the ice dams and to prevent damage to the roof of the building.

20 Claims, 1 Drawing Sheet

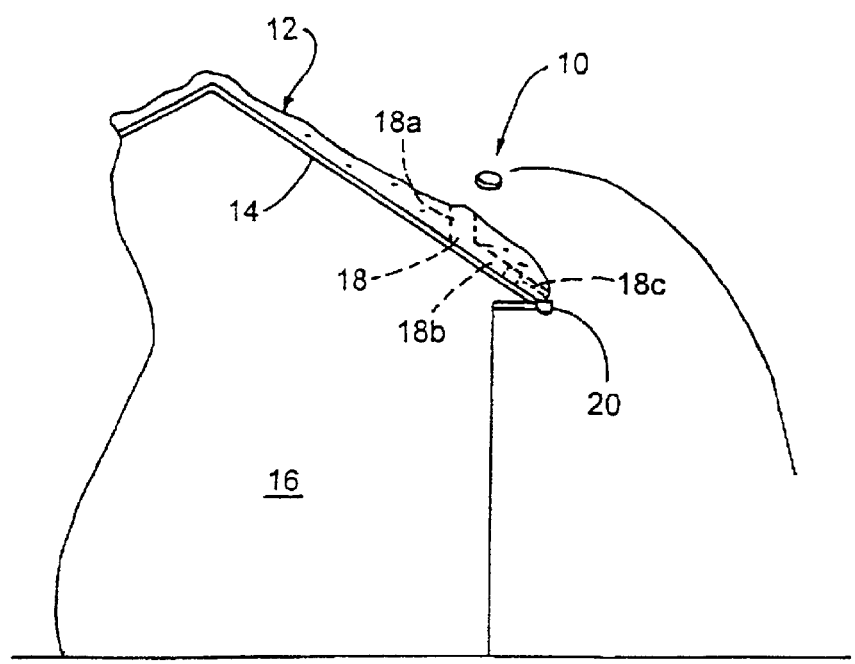
Fig. 1
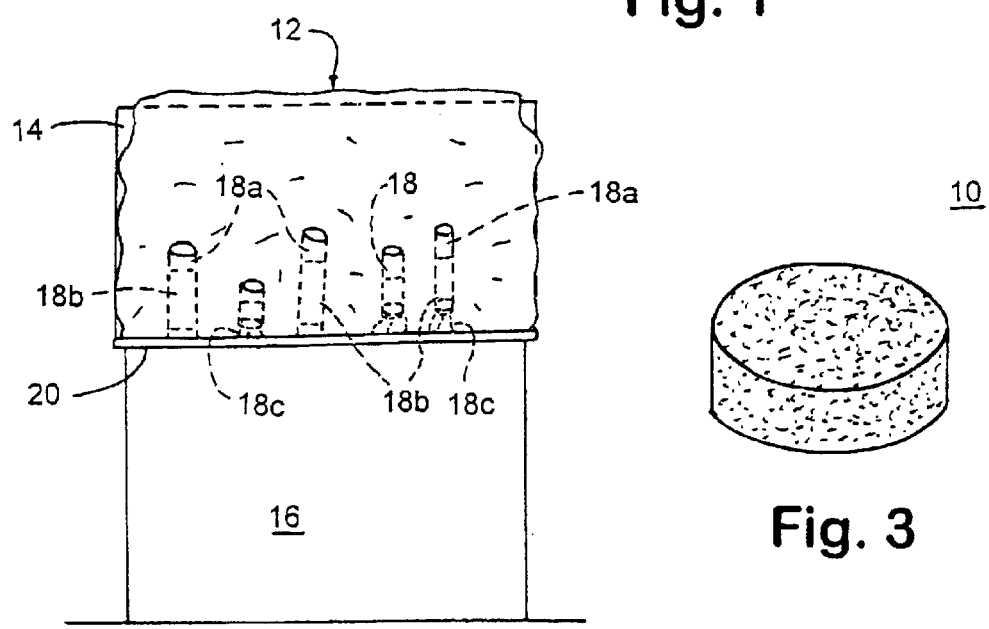
Fig. 2
Fig. 3

APPARATUS AND METHOD FOR MELTING ICE ON ROOFS

FIELD OF THE INVENTION

The present invention relates generally to a method for melting and removing snow and ice from a roof of a building and, more particularly, to a method for melting and breaking up ice dams which form at a lower portion of an inclined roof of a building.

BACKGROUND OF THE INVENTION

During winter time, a substantial amount of snow may accumulate on a roof of a building. Some of the snow on the roof may melt and then freeze to ice along the gutters, forming "ice dams". As the ice in the gutters or eaves builds up, any water accumulating at the lower portion of the roof may be forced back and up and may get under the shingles of the roof, thereby leading to leaks if the ice is not removed from the roof. It is known to throw salt pellets onto the roof to assist in melting some of the snow or ice from the roof. However, the salt pellets are small and dissolve after only melting a small area at the upper portion of the snow, and thus are ineffective at melting the ice dams formed at the lower or shingle level of the snow and ice on the roof, since the lower layers of ice may be thick and/or may be beneath a substantial amount of snow.

It is also known to place a number of salt pellets into a mesh netting, such as a nylon stocking or the like, and throw the salt pellets and netting onto the roof. Because there is a substantial amount of salt pellets within the mesh netting, all of the salt pellets do not dissolve before they melt a substantial amount of the snow or ice in the area in which they were placed. However, the mesh netting only melts down to the level of the roof and does not melt any ice along the roof, since the mesh netting does not slide along the incline of the roof. Also, after the salt pellets have dissolved, the mesh netting is left on the roof and may clog the eves or the down spouts if not removed.

In some situations, a person may chisel at the snow or ice and/or shovel the snow or ice off the roof manually, either independent of any other ice removal technique or after placing salt pellets onto the roof to melt at least some of the snow and ice. Such an approach is very difficult and dangerous to accomplish because the person shoveling or chiseling the snow must be at or on the rooftop where they may easily slip and fall.

SUMMARY OF THE INVENTION

The present invention is intended to provide a method of removing snow or ice from an inclined roof of a building which includes throwing or otherwise placing one or more melting discs (or other shaped melting members) of substantial size onto the snow or ice on the roof, whereby the melting discs melt a substantial amount of snow or ice along the inclined surface of the roof before the discs dissolve.

According to an aspect of the present invention, a method of removing snow or ice from an inclined roof of an building comprises providing at least one melting member which is adapted to melt snow and ice which comes in contact with the melting member. The melting member is soluble such that the melting member dissolves as it melts the snow or ice. The melting member is a tablet of sufficient size for melting a substantial amount of ice or snow before completely dissolving. The method further includes placing the melting member or members onto the snow or ice formed on the inclined roof of the building. The snow or ice is melted beneath and around the melting member while the melting member moves through the snow or ice generally downward toward the roof of the building. The melting member melts the snow or ice as it moves through the snow or ice generally downwardly along the incline of the roof, thereby forming at least one channel through the snow or ice along the incline of the roof. The water from the melted snow and ice is then drained through the at least one channel formed by the melting member or members to remove the water from the roof and thus prevent damage to the roof.

Preferably, the melting member comprises calcium chloride which is pressed into a tablet form. Preferably, the tablet form is a disc shaped form having a diameter of at least approximately two to two and a half inches or more and a thickness of at least approximately one inch or more. Preferably, the size of the tablet is selected to be of sufficient size to ease throwing of the tablet up onto a roof of a building, and may vary depending on the application.

These and other objects, advantages, purposes and features of this invention will become apparent upon review of the following specification in conjunction with the drawings.

BRIEF DESCRIPTION OF THE DRAWINGS

FIG. 1 is a front elevation of a building with a melting member being placed onto snow or ice formed along an inclined roof of the building in accordance with the present invention;

FIG. 2 is a side elevation of the building of FIG. 1 with multiple melting members placed thereon in accordance with the present invention; and FIG. 3 is a perspective view of a disc shaped melting member in accordance with the present invention.

DESCRIPTION OF THE PREFERRED EMBODIMENTS

Referring now specifically to the drawings and the illustrative embodiments depicted therein, a melting member 10 is placed onto snow and/or ice 12 formed along an inclined roof 14 of a building 16, in order to melt the snow and/or ice 12 from the roof 14 (FIGS. 1 and 2). As shown in FIGS. 1 and 2, melting member 10 forms a channel 18 through the snow and/or ice 12 as it melts the snow and/or ice which comes in contact with melting member 10 or is in the immediate vicinity of melting member 10. Melting member 10 melts through the snow and/or ice in a generally downward and vertical direction until melting member 10 reaches the roof 14, thereby forming a generally vertical channel 18a through the snow and ice to the roof. The melting member or portions of the melting member then slide or flow downward along the inclined surface of the roof 14 to form at least one inclined channel 18b along the inclined surface of the roof. The melting member may at least partially dissolve in water trapped at the lower portion of the roof, whereby the dissolved particles or portions of the melting member may flow through the water to the ice along the eaves of the building and melt or drill multiple passageways or channels 18c through the ice. The trapped water may then flow through the channels 18c to drain from the roof.

In the illustrated embodiment, melting member 10 is a soluble member and is a sufficient size to melt a substantial amount of snow and/or ice before completely dissolving. Preferably, melting member 10 comprises calcium chloride pressed into a tablet form. The calcium chloride tablet is soluble and dissolves as it contacts and melts snow and/or ice. The calcium chloride composition may also include one or more lubricants to retain the calcium chloride in its desired form or shape. For example, the calcium chloride may include calcium sterate or the like to retain its desired shape. Although described as comprising calcium chloride, other chemical compositions and/or other lubricants, which melt snow and ice on contact, may be implemented without affecting the scope of the present invention.

The calcium chloride may be pressed into a tablet of any shape. In a preferred embodiment, as shown in FIG. 3, melting member 10 is disc shaped and has a diameter of approximately 2½ inches or more and a thickness of approximately one inch or more. The tablet is preferably has a sufficient size and weight to ease throwing of the tablet up onto a roof of a building. Clearly, melting member 10 may be of different sizes, without affecting the scope of the present invention. Although shown and described as being generally disc shaped, the melting member 10 may otherwise be ball or sphere shaped, or may be any other shape which allows the tablet to move through the snow and ice and along the inclined surface of the roof, without affecting the scope of the present invention.

Melting member 10 may be placed onto the roof via any appropriate manner, such as throwing or otherwise projecting or propelling the melting member onto the snow or ice of the roof. The melting member may thus be placed at the snow and ice on the roof from a location remote from the roof, in order to avoid having to climb onto the roof to implement the melting member of the present invention. When the melting member comes to rest on top of the snow or ice 12, melting member 10 begins melting the ice which comes in contact with the melting member. As the ice and snow beneath the melting member is melted, melting member 10 moves generally vertically downward due to gravity and forms the generally vertical channel 18a through the snow and ice on the inclined roof 14 of building 16. When melting member 10 has melted the snow down to the level of the shingles of the roof 14, melting member 10 may move or slide downward at least partially along the shingles of the inclined roof 14 as it continues to melt the snow or ice downward along the roof and toward the eaves 20 of roof 14. This downward movement along the roof may form an inclined channel 18b along the inclined surface of the roof.

When melting member 18 reaches water trapped by the ice formed in and along the eaves, melting member 18 at least partially dissolves in the water and thus at least partially breaks up into smaller portions or particles, such as calcium chloride particles. These particles flow through the water downward to the ice dam, since the water carrying the particles is heavier than the water that does not contain such particles. After melting member 10 has melted the snow or ice along the roof, such that channel 18b extends at least substantially downward toward the eaves 20 of the roof 14, and after the particles have melted or drilled holes or channels through the ice dam, any water from melting of the snow or ice on the roof may then flow off the roof and down through the channels 18c to the eaves, such that the water does not rest at the roof and shingles, where it otherwise may cause damage to the roof or freeze on the roof.

As shown in FIG. 2, multiple melting members 10 may be thrown, projected or otherwise placed at the roof to melt the snow and ice and form multiple channels through the snow and ice along the roof. The multiple melting members 10 are thrown or otherwise placed at the roof surface and spaced apart along the roof surface, in order to form multiple, generally parallel channels through the snow or ice and along the inclined surface of the roof. When the melting members dissolve or partially dissolve in the water trapped on the roof by the ice dam, the particles in the water function to melt or drill multiple holes or channels through the ice dam along the lower edge of the inclined roof. The multiple channels function not only to drain the water from the roof of the building to limit or substantially prevent build up of additional ice, but also to break up the ice dams formed at the roof of the building to allow the ice dams to fall off of the roof and onto the ground without any further manual intervention. This not only allows for a substantial amount of water to drain from the roof through the channels, but also facilitates safe and easy breaking up of the ice dams on the roof.

Accordingly, the melting members of the present invention function to melt or drill through the ice dams to and along the roof level of the building to melt a portion of the ice dams and to break up or at least weaken the ice dams on the roof of the building. Each of the melting members is large enough to melt a substantial amount of snow or ice on and along the roof of the building to allow the melting member to melt downward through the ice and then to slide or flow along the roof of the building, thereby forming at least one channel in the ice along the roof surface. The channel or channels allow the water from the melted snow and ice to drain off of the roof through the channels to prevent damage to the roof. Because multiple melting members may be thrown or otherwise placed onto the roof, multiple channels may be formed along the inclined roof surface to also weaken the ice dams at the roof so that they fall off onto the ground, thereby avoiding any manual removal of the ice dams from the roof.

Therefore, the melting members of the present invention may be thrown or otherwise placed or propelled onto the roof of the building from the ground level, such that a person placing the melting member or members onto the roof of the building does not have to climb onto to the roof to utilize the present invention. The melting members function to melt through ice dams formed on the roof, thereby allowing water to drain from the roof safely, with no need for a person to climb onto the roof to remove or break up the ice dams. This not only limits or precludes damage to the roof from the ice dams, but also allows for a safe and easy method of breaking up and removing the ice dams formed on the roof. Additionally, the melting members are entirely soluble, such that the remnants of a melting member will completely dissolve in the snow or water and thus will not clog any of the eaves or downspouts of the building.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege as claimed are defined as follows:

1. A method of removing snow or ice from a roof of a building, the roof having an inclined surface, said method comprising:

providing at least one melting member which is adapted to melt snow and ice which contacts said at least one melting member, said at least one melting member being soluble such that said at least one melting member dissolves as said at least one melting member melts the snow or ice, said at least one melting member comprising a pressed tablet of sufficient size for melting a substantial amount of ice or snow before completely dissolving;

propelling said at least one melting member on snow or ice formed on an inclined roof of a building from a location remote from the inclined roof of the building;

melting the snow or ice beneath and around said at least one melting member while said at least one melting member moves through the snow or ice generally downward toward the roof of the building, at least a portion of said at least one melting member moving through water, snow and/or ice generally downwardly along the inclined surface of the roof and melting at least one channel through the ice along a lower portion of the inclined surface of the roof; and draining water from melted snow or ice through said at least one channel formed by said at least one melting member.

2. The method of claim 1, wherein placing said at least one melting member includes propelling said at least one melting member onto the snow or ice on the roof from a location remote from the roof of the building.

3. The method of claim 1, wherein providing at least one melting member includes providing at least one melting member which comprises calcium chloride pressed into a tablet form.

4. The method of claim 3, wherein providing at least one melting member includes providing at least one melting member which is pressed into a generally disc shaped form.

5. The method of claim 4, wherein providing at least one melting member includes providing at least one melting member having a diameter of at least approximately two inches.

6. The method of claim 5, wherein providing at least one melting member includes providing at least one melting member having a thickness of at least approximately one inch.

7. The method of claim 1 including breaking up the snow or ice formed on the roof by said at least one channel being formed through the snow or ice.

8. The method of claim 7 including removing the broken up snow or ice from the roof.

9. The method of claim 1, wherein melting the snow or ice includes:

at least partially dissolving said at least one melting member in water trapped at the lower portion of the inclined surface of the roof;

flowing partially dissolved particles of said at least one melting member through the water to the ice along the lower portion of the inclined surface of the roof; and melting a plurality of channels through the ice with said partially dissolved particles.

10. The method of claim 1, wherein providing at least one melting member includes providing a plurality of melting members and wherein placing said at least one melting member includes placing said plurality of melting members.

11. The method of claim 10, wherein melting at least one channel includes melting multiple channels through an ice dam formed on the roof.

12. The method of claim 11 including breaking up the ice dam formed on the roof by said multiple channels formed through the ice dam by said plurality of melting members.

13. The method of claim 12 including removing the broken up ice dam from the roof.

14. A method of removing snow or ice from a roof of a building, the roof having an inclined surface, said method comprising:

providing at least one melting member which is adapted to melt snow and ice which contacts said at least one melting member, said at least one melting member being soluble such that said at least one melting member dissolves as said at least one melting member melts the snow or ice, said at least one melting member comprising a pressed tablet and being disc shaped and having a diameter of at least approximately two and a half inches and a thickness of at least approximately one inch;

throwing said at least one melting member onto snow or ice formed on the inclined surface of the roof of a building from a location remote from the inclined roof;

melting the snow or ice beneath and around said at least one melting member while said at least one melting member moves through the snow or ice generally downward toward and at least partially along the inclined surface of the roof of the building to form at least one channel through ice along a lower portion of the inclined surface of the roof; and draining water from melted snow or ice through said channel formed by said at least one melting member.

15. The method of claim 14, wherein providing at least one melting member includes providing at least one melting member which comprises calcium chloride pressed into said disc shape.

16. The method of claim 14, wherein melting the snow or ice includes:

at least partially dissolving said at least one melting member in water trapped at the lower portion of the inclined surface of the roof;

flowing partially dissolved particles of said at least one melting member through the water to the ice along the lower portion of the inclined surface of the roof; and melting a plurality of channels through the ice with said partially dissolved particles.

17. The method of claim 14, wherein providing at least one melting member includes providing a plurality of melting members and wherein throwing said at least one melting member includes throwing said plurality of melting members.

18. The method of claim 17, wherein melting the snow or ice includes melting the snow or ice as said plurality of melting members move generally vertically downwardly through the snow or ice to the inclined roof and then generally downwardly at least partially along the inclined surface of the roof to form a plurality of channels through the snow or ice along the inclined surface of the roof.

19. The method of claim 18 including breaking up the snow or ice formed on the roof by said plurality of channels.

20. The method of claim 14 including removing the broken up snow or ice from the roof.

* * * * *